United States Patent [19]

Young et al.

[11] Patent Number: 4,667,286

[45] Date of Patent: May 19, 1987

[54] METHOD AND APPARATUS FOR TRANSFERRING DATA BETWEEN A DISK AND A CENTRAL PROCESSING UNIT

[75] Inventors: Mark S. Young, Mountain View; John Drew, Los Gatos; Michael C. Shebanow, Berkeley, all of Calif.

[73] Assignee: Advanced Micro Devices, Inc., Sunnyvale, Calif.

[21] Appl. No.: 684,769

[22] Filed: Dec. 20, 1984

[51] Int. Cl.[4] .............................................. G06F 13/38
[52] U.S. Cl. ................................................... 364/200
[58] Field of Search ... 364/200 MS File, 900 MS File

[56] References Cited

U.S. PATENT DOCUMENTS 4,148,098  4/1979  McCreight et al. ................. 364/200

*Primary Examiner*—Raulfe B. Zache
*Attorney, Agent, or Firm*—Patrick T. King; Warren M. Becker; J. Vincent Tortolano

[57] ABSTRACT

A method and apparatus for transferring data between a disk and a CPU is disclosed comprising a pair of toggling header buffers and a pair of toggling data buffers. In operation, data is transferred between a sector on a disk and one of the data buffers under the control of one of the header buffers. While the data in the header buffer is being transferred between the data buffer and a CPU, data is transferred between an adjacent sector on the disk and the other data buffer under the control of the other header buffer. The rate of transfer of data between the data buffer and the CPU is higher than the rate of transfer of the data between the disk and the other data buffer. This provides sufficient time to check the data transferred from and to the CPU for errors and to address a new sector on the disk prior to the completion of the data transfer of the previous sector between the disk and the data buffer. By means of the method and apparatus disclosed, all sectors in a track on a disk can be transferred between a disk and a CPU within a single revolution of the disk.

12 Claims, 2 Drawing Figures

METHOD AND APPARATUS FOR TRANSFERRING DATA BETWEEN A DISK AND A CENTRAL PROCESSING UNIT

BACKGROUND OF THE INVENTION

1. Field of the Invention

The present invention relates to a method and apparatus for transferring data between a disk and a central processing unit (CPU) in general and to a method and apparatus for transferring data between a disk and a CPU comprising toggling dual header and dual data buffers in particular.

2. Description of Prior Art

Data stored on a disk is typically stored in a plurality of addressable sectors which are located in a plurality of concentric tracks.

To transfer data to or from the disk in a conventional manner, a CPU transfers a header to a disk controller (DC). The header contains information about the sector including its address or location on the disk. After receiving the header, the disk controller accesses the sector and transfers the data between the CPU or an intermediate data buffer and the disk.

Each of the steps involved in accessing and reading data from or transferring data to a sector on a disk takes time. Additonal time is required when the data being transferred to or from a disk is subjected to error detection and correction procedures.

In relatively simple disk storage systems, the time required to address a sector, allow the addressing circuits to stabilize, retrieve data from or transfer data to the sector on the disk and to check the data for errors generally prevents the accessing of physically adjacent sectors within a single revolution of the disk.

Apparatus capable of accessing physically adjacent sectors on a disk within a single revolution of the disk have been proposed; however, they are generally unsatisfactory for one reason or another. For example, in one such prior known apparatus, all sectors in a track are read by simply addressing the track and commencing the reading of the sectors upon the detection of an index mark on the track. In this apparatus, header information is not used and therefore the time required to set up and stabilize the sector addressing circuits is not required. However, because sectors are not individually addressed, conventional data processing, such as error detection and correction, is generally not possible or is impractical.

In another prior known scheme, a plurality of non-toggling header and data buffers are used for individually addressing successive sectors in a track. However, in this scheme extra control lines and tracking information is required to be processed in order to synchronize the disk controller with the disk and the CPU operations.

SUMMARY OF THE INVENTION

In view of the foregoing, a principle object of the present invention is a method and apparatus for transferring data between a disk and a CPU comprising a pluraliy of toggling header and data buffers A and B.

In an example of the operation of the apparatus data is transferred between a sector on the disk and a data buffer A under the control of a header in a header buffer A. While the data in data buffer A is being transferred between data buffer A and the CPU, data is transferred between a physically adjacent sector on the disk and a data buffer B under the control of a header in a header buffer B.

A novel feature of the present invention is that the rate at which the contents of the data buffers is transferred between the data buffers and the CPU is at a rate which is considerably higher than the rate at which the data is transferred between physically adjacent sectors on the disk and the data buffers.

In the given example, when the transfer of data to or from the data buffer A has been completed, the header buffer A is free to accept a new header. By completing the transfer well before the completion of the transfer between the disk and data buffer B, sufficient time remains for the CPU to transfer header information relating to an adjacent sector on the disk to the header buffer A, to check the data transferred to or from the CPU for errors, to issue a READ or WRITE command to the disk controller and to allow the accessing circuits to stabilize before the addressed sector passes the disk read head. Thereafter, when the data transfer between the disk and the data buffer B is completed, the header and data buffers A and B are toggled to commence the transfer of data between the data buffer B and the CPU and data between the adjacent sector on the disk and the data buffer A.

More specifically the rate of data transfer between the CPU and the data buffers is sufficiently different from the rate of data transfer beween the disk and the data buffers so as to permit reading from or writing to all sectors from a disk within one revolution of the disk.

BRIEF DESCRIPTION OF THE DRAWING

The above and other objects, features and advantages of the present invention will become apparent from the following detailed description of the accompanying drawing in which.

DETAILED DESCRIPTION OF THE DRAWING

Figure 1:
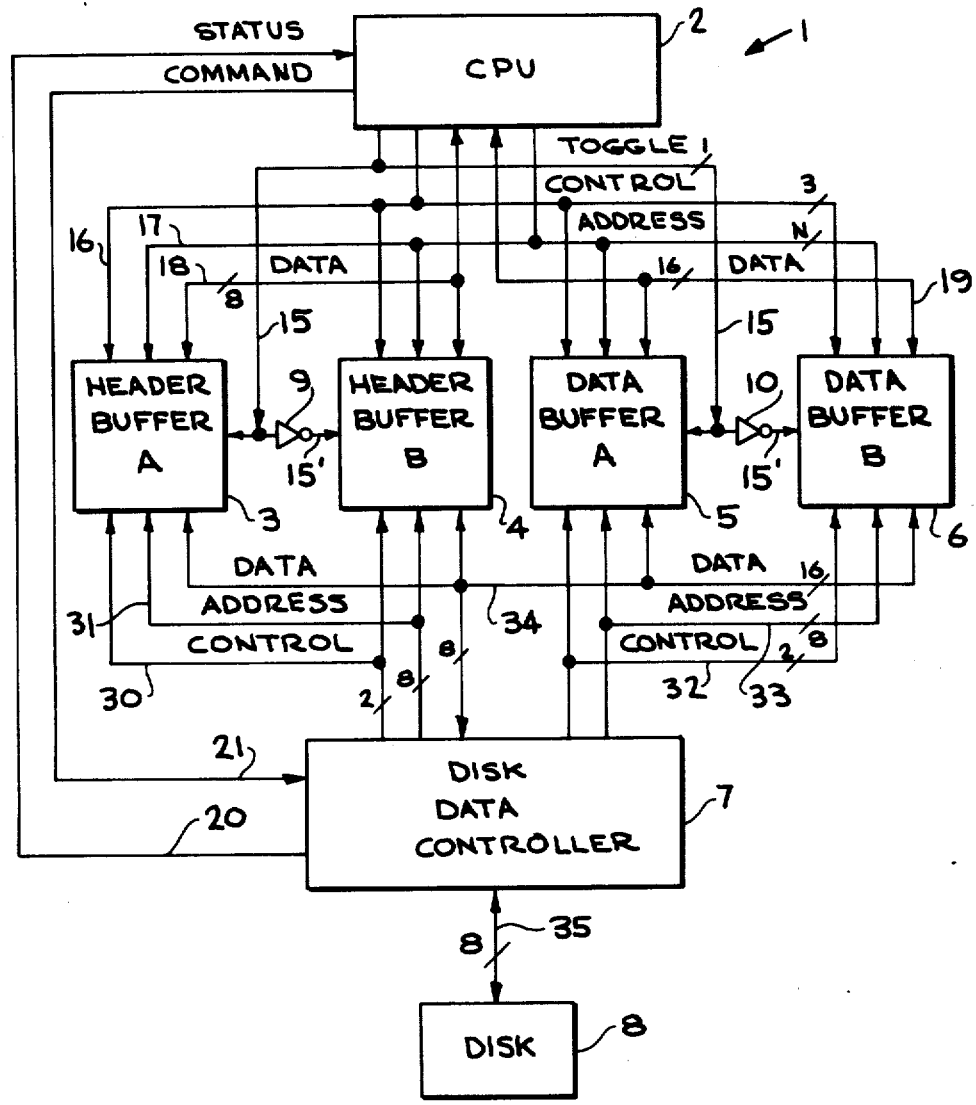
FIG. 1 is a block diagram of an apparatus comprising toggling header and data buffers according to the present invention.

Referring to FIG. 1, there is provided in accordance with the present invention a data transfer apparatus designated generally as 1. In the apparatus 1 there is provided a CPU 2, a header buffer A designated generally as 3, a header buffer B designated generally as 4, a data buffer A designated generally as 5, a data buffer B designated generally as 6, a disk data controller 7, a disk 8 and a pair of inverters 9 and 10.

The CPU 2 is coupled to header and data buffers 3 and 5 and the input of inverters 9 and 10 by means of a toggle signal line 15, to header and data buffers 3–6 by means of a 3-wire control signal bus 16 and an N-wire address bus 17, where $2^N$ is equal to or greater than the buffer size, the header buffers 3 and 4 by means of an N-wire data bus 18 and to data buffers 5 and 6 by means of a 16-wire data bus 19. The outputs of the inverters 9 and 10 are coupled to header and data buffers 4 and 5 by means of a toggle signal line designated as 15'.

The disk data controller 7 is coupled to the CPU by means of a status bus 20 and a command signal bus 21, to the header buffers 3 and 4 by means of a 3-wire control signal bus 30 and an N-wire address bus 31, to the data buffers 5 and 6 by means of a 3-wire control signal bus 32, an N-wire address signal bus 33, to the header and data buffers 3–6 by means of a 16-wire data bus 34 and to the disk 8 by means of an N-wire data bus 35.

Figure 2:
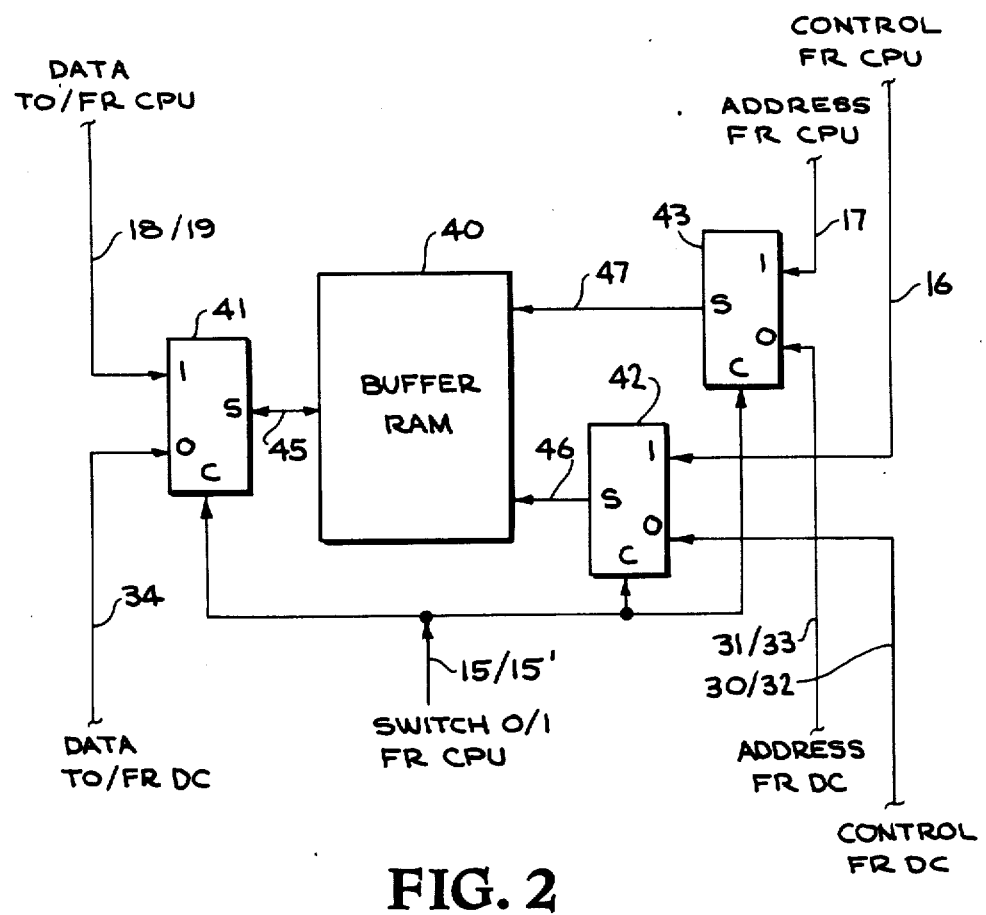
FIG. 2 is a more detailed block diagram of one of the header and data buffers of FIG. 1.

Referring to FIG. 2 there is provided in each of the buffers 3–6 a random access memory (RAM) 40 and a plurality of multiplexers 41, 42 and 43.

The size of the RAM 40 and the number of address lines required to address it depends on whether it is located in header buffers 3 and 4 or data buffers 5 and 6. In practice, the size of the RAM 40 is smaller and the number of address lines are fewer when it is in header buffers 3 and 4 than when it is in data buffers 5 and 6.

In each of the multiplexers 41–43 there is provided a plurality of ports 0, 1 and S and a control signal port C.

In the multiplexer 41, port 0 is coupled to data bus 34. Port 1 is coupled to data bus 18 or 19, depending on whether RAM 40 is in header buffers 3 and 4 or in data buffers 5 and 6, respectively. Port S is coupled to RAM 40 by means of a data bus 45. Port C is coupled to toggle signal line 15 or 15', depending on whether RAM 40 is in header buffer 3 and data buffer 5 or in header buffer 4 and data buffer 6, respectively.

In multiplexer 42, port 0 is coupled to control signal bus 30 or 32 depending on whether RAM 40 is in header buffer 3 and 4 or data buffer 5 and 6, respectively. Port 1 is coupled to control signal bus 16. Port S is coupled to RAM 40 by means of a control bus 46. Port C is coupled to toggle signal line 15 or 15' depending on whether RAM 40 is in header buffer 3 and data buffer 5 or header buffer 4 and data buffer 6, respectively.

In multiplexer 43, port 0 is coupled to address bus 31 or 33 depending on whether RAM 40 is in header buffers 3 and 4 or in data buffers 5 and 6, respectively. Port 1 is coupled to control bus 16. Port S is coupled to RAM 40 by means of an address bus 47. Port C is coupled to toggle signal line 15 or 15' depending on whether RAM 40 is in header buffer 3 and data buffer 5 or header buffer 4 and data buffer 6, respectively.

In the operation of the apparatus of FIG. 2, when a logical 0 is applied to port C of multiplexers 41, 42 and 43, the buffer RAM 40 is coupled to the control, address and data busses of the disk data controller 7. On the other hand, when a logical 1 is placed on the control port C of the multiplexers 41, 42 and 43, the buffer RAM 40 is copuled to the control, address and data busses of the CPU 2.

In view of the foregoing and because of the inverters 9 and 10, it will be seen that whenever header buffer A and data buffer A are coupled to the control, address and data busses of the disk data controller 7, the header buffer B and data buffer B will be coupled to the control, address and data busses of the CPU 2 and vice versa.

With the foregoing explanation of the operation of the apparatus of FIG. 2, the operation of apparatus 1 of FIG. 1 will now be described with regard to a transfer of data from the disk to the CPU, it being understood that a transfer of data from the CPU to the disk will involve the same procedures, but in a reverse direction. In the following description, a reference to the coupling of the CPU 2 and the disk data controller 7 to a particular buffer means that the control, address and data busses of the CPU 2 and the disk data controller 7 are being coupled to the buffer.

Assuming it is desired to transfer the contents of a first sector from the disk 8 to data buffer A, the CPU 2 will place a logical 1 on the toggle signal line 15. With a logical on the toggle signal line 15, header buffer A and data buffer A will be coupled to the CPU 2 and header buffer B and data buffer B will be coupled to the disk data controller 7. With the header buffer A and data buffer A coupled to the CPU 2, the CPU 2 transfers the header of the first sector on the disk 8 to the header buffer A and then toggles the buffers by placing a logical 0 on toggle signal line 15 and sends a READ command to the disk controller 7 on the line 21. With a logical 0 on the toggle signal line 15, header buffer A and data buffer A are now connected to the disk data controller 7 while the header buffer B and data buffer B are connected to the CPU 2.

With the header buffer A coupled to the disk data controller 7 and under the control of the READ command, the contents of the first sector from the disk 8 are transferred to the data buffer A. During the time that the contents of the first sector on the disk 8 are being transferred to the data buffer A, the CPU 2, which is now connected to the header buffer B, transfers the header of a physically adjacent second sector to the header buffer B. When the transfer of the contents of the first sector from the disk 8 to the data buffer A has been completed, the CPU 2 places a logical 1 on the toggle signal line 15, toggling the header and data buffers, and sends another READ command to the disk controller 7. With the header and data buffers A coupled to the CPU and the header and data buffers B coupled to the disk data controller 7, the contents of the data buffer A are transferred to the CPU 2 while the contents of the second sector on the disk 8 is transferred to the data buffer B under the control of the READ command.

An important feature of the present invention is that the transfer of the contents of a data buffer to the CPU 2 is at a higher rate than the transfer of the contents of a sector on the disk 8 to the data buffer. In practice, the rate of data transfer to the CPU 2 from a data buffer is high enough to permit the CPU 2 to subject the data transferred thereto to error detection procedures, the results of which are indicated on the status line 21, and to permit the CPU to transfer a new header to the header buffer A before the completion of a data transfer from the disk 8 to the data buffer B. When this occurs, as described above, it will be appreciated that all sectors in a track on the disk 8 can be transferred to data buffer A and data buffer B alternately within a single revolution of the disk.

While a preferred embodiment of the present invention has been described, it is contemplated that various modifications may be made thereto without departing from the spirit and scope of the present invention. Accordingly, it is intended that the embodiments described be considered only as illustrative of the invention and that the scope of the invention be determined by reference to the claims hereinafter provided.

What is claimed is:

1. A method of transferring data between a disk and a central processing unit (CPU) comprising the sequential steps of:
 (a) transferring a header for addressing a sector on said disk from said CPU to a header buffer A;
 (b) transferring data between said sector on said disk addressed by said header in said header buffer A and a data buffer A;
 (c) transferring a header for addressing another sector on said disk from said CPU to a header buffer B while said data is being transferred between said previous sector and said data buffer A;

(d) transferring said data between said sector on said disk addressed by said header in said header buffer B and a data buffer B after said transfer of said data between said sector and said data buffer A is completed;

(e) transferring and completing the transfer of said data between said data buffer A and said CPU before the transfer of said data between said sector and said data buffer B is completed;

(f) transferring a header for addressing another sector on said disk from said CPU to said header buffer A after said transfer of said data between said data buffer A and said CPU is completed and before the transfer between said sector and said data buffer B is completed;

(g) transferring data between said sector on said disk addressed by said header in said header buffer A and said data buffer A after said transfer of the data between said sector on said disk and said data buffer B is completed;

(h) transferring and completing the transfer of the data between said data buffer B and said CPU before the transfer of said data between said sector on said disk and said data buffer A is completed;

(i) transferring a header for addressing another sector on said disk from said CPU to said header buffer B after said transfer of said data between said data buffer B and said CPU is completed and before the transfer of said data between said sector on said disk and said data buffer A is completed;

(j) repeating steps (d) through (i) for all headers transferred from said CPU to said header buffers A and B.

2. A method according to claim 1 wherein said sectors comprise physically adjacent sectors and all of said transferring steps occur within a single revolution of said disk.

3. A method according to claim 1 wherein said transferring steps comprise the step of toggling said header and data buffers A and B after each transfer of said data between a data buffer and said CPU.

4. A method according to claim 1 wherein said transferring steps to and from said data buffers A and B comprises the steps of transferring said data between said data buffers and said CPU at a predetermined rate which is higher than the rate at which said data is transferred between said disk and said data buffers.

5. A method according to claim 4 wherein said predetermined rate comprises a rate which permits the CPU to transfer a header to a header buffer, check the data transferred between a data buffer and the CPU for errors and toggle said header and data buffers to commence transferring data between the next physically adjacent sector on said disk and a data buffer within the current revolution of the disk.

6. A method according to claim 3 wherein said toggling step comprises the steps of switching said header buffer A from said CPU to a disk controller and said header buffer B from said disk controller to said CPU while at the same time switching said data buffer A from said CPU to said disk controller and said data buffer B from said disk controller to said CPU and vice versa sequentially.

7. An apparatus for transferring data between a disk and a central processing unit (CPU) comprising:

means for transferring a header for adressing a first sector on said disk from said CPU to a header buffer A;

means for transferring data between said first sector on said disk addressed by said header in said header buffer A and a data buffer A;

means for transferring a header for addressing another sector on said disk from said CPU to a header buffer B while said data is being transferred between said previous sector and said data buffer A;

means for transferring said data between said sector on said disk addressed by said header in said header buffer B and a data buffer B after said transfer of said data between said first sector and said data buffer A is completed;

means for transferring and completing the transfer of said data between said data buffer A and said CPU before the transfer of said data between said second sector and said data buffer B is completed;

means for transferring a header for addressing another sector on said disk from said CPU to said header buffer A after said transfer of said data between said data buffer A and said CPU is completed and before the transfer between said sector and said data buffer B is completed;

means for transferring data between said last identified sector on said disk addressed by said header in said header buffer A and said data buffer A after said transfer of the data between said previous sector on said disk and said data buffer B is completed;

means for transferring and completing the transfer of the data between said data buffer B and said CPU before the transfer of said data between said last identified sector on said disk and said data buffer A is completed;

means for transferring a header for addressing another sector on said disk from said CPU to said header buffer B after said transfer of said data between said data buffer B and said CPU is completed and before the transfer of said data between said last identified sector on said disk and said data buffer A is completed.

8. An apparatus according to claim 7 wherein said sectors comprise physically adjacent sectors and said transferring means comprise means for transferring all of said sectors within a single revolution of said disk.

9. An apparatus according to claim 7 wherein each of said transferring means comprise means for toggling said header and data buffers A and B after each transfer of said data between a data buffer and said CPU.

10. An apparatus according to claim 7 wherein said transferring means for transferring data to and from said data buffers A and B comprises means for transferring said data between said data buffers and said CPU at a predetermined rate which is higher than the rate at which said data is transferred between said disk and said data buffers.

11. An apparatus according to claim 10 wherein said predetermined rate comprises a rate which permits the CPU to transfer a header to a header buffer, check the data transferred between a data buffer and the CPU for errors and toggle said header and data buffers to commence transferring data between the next adjacent sector on said disk and a data buffer within the current revolution of the disk.

12. An apparatus according to claim 9 wherein said toggling means comprises means for switching said header buffer A from said CPU to a disk controller and said header buffer B from said disk controller to said CPU while at the same time switching said data buffer A from said CPU to said disk controller and said data buffer B from said disk controller to said CPU and vice versa sequentially.

* * * * *